(12) United States Patent  
Gunter

(10) Patent No.: US 8,654,817 B2
(45) Date of Patent: Feb. 18, 2014

(54) COMBINING SIGNALS WITH A SHUFFLED-HADAMARD FUNCTION

(71) Applicant: Google Inc., Mountain View, CA (US)

(72) Inventor: Michial Allen Gunter, Oakland, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/743,633

(22) Filed: Jan. 17, 2013

(65) Prior Publication Data

US 2013/0148695 A1 Jun. 13, 2013

Related U.S. Application Data

(63) Continuation of application No. 12/481,479, filed on Jun. 9, 2009, now Pat. No. 8,374,218, which is a continuation-in-part of application No. 10/402,878, filed on Mar. 28, 2003, now Pat. No. 7,545,849, and a continuation-in-part of application No. 12/356,791, filed on Jan. 21, 2009, now Pat. No. 8,385,470, which is a continuation-in-part of application No. 10/943,677, filed on Sep. 16, 2004, now abandoned, which is a continuation of application No. 09/730,697, filed on Dec. 5, 2000, now Pat. No. 6,829,289.

(51) Int. Cl.
*H04B 1/00* (2006.01)

(52) U.S. Cl.
USPC ............ 375/145; 375/130; 375/140; 375/141

(58) Field of Classification Search
USPC .......................................................... 375/145
See application file for complete search history.

(56) References Cited

U.S. PATENT DOCUMENTS

| 4,358,844 A | 11/1982 | Pirani |
| 4,558,302 A | 12/1985 | Welch |
| 4,578,676 A | 3/1986 | Harrison, Jr. |

(Continued)

FOREIGN PATENT DOCUMENTS

| CN | 1301090 A | 6/2001 |
| CN | 1732634 A | 2/2006 |

(Continued)

OTHER PUBLICATIONS

Bernardini A. et al. Linear Prediction Methods for Interference Elimination in Spread Spectrum Systems, European Transaction on Telecommunications and Related Technologies, AEI, Milano, IT, vol. 1, No. 1, 1990, pp. 67-78, XP000170707, ISSN: 112-3862.

(Continued)

*Primary Examiner* — Erin File
(74) *Attorney, Agent, or Firm* — Fish & Richardson P.C.

(57) ABSTRACT

A method can include receiving, at a transmitter, during a symbol time that comprises a plurality of chip times, a data value for each of a plurality of distinct data channel inputs. During each chip time, the method can include (a) indexing a different row of a matrix of data bits; (b) decoding one channel input using a first subset of one or more columns of the indexed row; (c) determining a code value for the decoded one channel from a second subset of one or more columns of the indexed row; and (d) providing the coded data value to a transmission circuit for transmission to a receiver. Actions (a) to (d) can be performed for each of the plurality of chip times in the symbol time. In some implementations, the matrix of data bits is a Hadamard matrix with randomly shuffled rows.

23 Claims, 9 Drawing Sheets

(56) References Cited

U.S. PATENT DOCUMENTS

| | | |
|---|---|---|
| 5,136,375 A | 8/1992 | Citta et al. |
| 5,268,927 A | 12/1993 | Dimos et al. |
| 5,278,871 A | 1/1994 | Rasky et al. |
| 5,410,568 A | 4/1995 | Schilling |
| 5,515,396 A | 5/1996 | Dalekotzin |
| 5,623,485 A | 4/1997 | Bi |
| 5,646,964 A | 7/1997 | Ushirokawa et al. |
| 5,649,299 A | 7/1997 | Battin et al. |
| 5,677,929 A | 10/1997 | Asano et al. |
| 5,687,191 A | 11/1997 | Lee et al. |
| 5,691,974 A | 11/1997 | Zehavi et al. |
| 5,715,236 A | 2/1998 | Gilhousen et al. |
| 5,729,465 A | 3/1998 | Barabaresco |
| 5,742,694 A | 4/1998 | Eatwell et al. |
| 5,809,060 A | 9/1998 | Cafarella et al. |
| 5,809,061 A | 9/1998 | Shea et al. |
| 5,822,360 A | 10/1998 | Lee et al. |
| 5,825,807 A | 10/1998 | Kumar |
| 5,864,548 A | 1/1999 | Liu |
| 5,872,540 A | 2/1999 | Casabona et al. |
| 5,940,429 A | 8/1999 | Lam et al. |
| 5,940,791 A | 8/1999 | Byrnes et al. |
| 5,943,421 A | 8/1999 | Grabon |
| 5,995,923 A | 11/1999 | Mermelstein et al. |
| 6,005,891 A | 12/1999 | Chadwick et al. |
| 6,009,118 A | 12/1999 | Tiemann et al. |
| 6,009,129 A | 12/1999 | Kenney et al. |
| 6,011,789 A | 1/2000 | Schilling |
| 6,040,864 A | 3/2000 | Etoh |
| 6,072,822 A | 6/2000 | Naruse et al. |
| 6,091,725 A | 7/2000 | Cheriton et al. |
| 6,091,760 A | 7/2000 | Giallorenzi et al. |
| 6,125,378 A | 9/2000 | Barbano |
| 6,128,332 A | 10/2000 | Fukawa et al. |
| 6,169,912 B1 | 1/2001 | Zuckerman |
| 6,173,331 B1 | 1/2001 | Shimonishi |
| 6,185,246 B1 | 2/2001 | Gilhousen |
| 6,185,426 B1 | 2/2001 | Alperovich et al. |
| 6,211,828 B1 | 4/2001 | Krylov et al. |
| 6,229,478 B1 | 5/2001 | Biacs et al. |
| 6,249,760 B1 | 6/2001 | Bossemeyer et al. |
| 6,256,609 B1 | 7/2001 | Byrnes et al. |
| 6,330,291 B1 | 12/2001 | Agrawal et al. |
| 6,359,875 B1 | 3/2002 | Hamada et al. |
| 6,370,183 B1 | 4/2002 | Newson et al. |
| 6,393,047 B1 | 5/2002 | Popovic' |
| 6,411,645 B1 | 6/2002 | Lee et al. |
| 6,418,147 B1 | 7/2002 | Wiedeman |
| 6,426,977 B1 | 7/2002 | Lee et al. |
| 6,449,305 B1 | 9/2002 | Menich et al. |
| 6,463,089 B1 | 10/2002 | Chauncey et al. |
| 6,496,474 B1 | 12/2002 | Nagatani et al. |
| 6,501,733 B1 | 12/2002 | Falco |
| 6,507,573 B1 | 1/2003 | Brandt et al. |
| 6,522,656 B1 | 2/2003 | Gridley |
| 6,526,091 B1 | 2/2003 | Nystrom et al. |
| 6,535,544 B1 | 3/2003 | Partyka |
| 6,545,975 B1 | 4/2003 | Giardina et al. |
| 6,560,445 B1 | 5/2003 | Fette et al. |
| 6,563,793 B1 | 5/2003 | Golden et al. |
| 6,611,519 B1 | 8/2003 | Howe |
| 6,611,600 B1 | 8/2003 | Leber et al. |
| 6,621,796 B1 | 9/2003 | Miklos |
| 6,640,209 B1 | 10/2003 | Das |
| 6,657,986 B1 | 12/2003 | Laudel et al. |
| 6,665,825 B1 | 12/2003 | Mobin et al. |
| 6,675,125 B2 | 1/2004 | Bizjak |
| 6,678,341 B1 | 1/2004 | Miyake et al. |
| 6,691,092 B1 | 2/2004 | Udaya Bhaskar et al. |
| 6,754,282 B1 | 6/2004 | Ross et al. |
| 6,807,161 B2 | 10/2004 | Bender et al. |
| 6,826,241 B2 | 11/2004 | Kahana |
| 6,829,289 B1 | 12/2004 | Gossett et al. |
| 6,970,681 B2 | 11/2005 | Darabi et al. |
| 6,982,945 B1 | 1/2006 | Gossett |
| 7,016,398 B2 | 3/2006 | Bradley |
| 7,050,545 B2 | 5/2006 | Tanrikulu |
| 7,103,026 B2 | 9/2006 | Hall et al. |
| 7,106,782 B2 | 9/2006 | Howard et al. |
| 7,142,536 B1 | 11/2006 | Gossett et al. |
| 7,174,356 B2 | 2/2007 | Agami et al. |
| 7,352,833 B2 | 4/2008 | Gossett et al. |
| 7,453,921 B1 | 11/2008 | Gossett |
| 7,545,849 B1 | 6/2009 | Gunter |
| 7,551,664 B2 | 6/2009 | Zhang et al. |
| 7,733,943 B2 | 6/2010 | Gossett et al. |
| 2001/0033616 A1 | 10/2001 | Rijnberg et al. |
| 2002/0015388 A1 | 2/2002 | Kim et al. |
| 2002/0106004 A1 | 8/2002 | Tan |
| 2002/0118728 A1 | 8/2002 | Mohseni et al. |
| 2002/0172180 A1 | 11/2002 | Hall et al. |
| 2002/0191566 A1 | 12/2002 | Fogel |
| 2003/0009325 A1 | 1/2003 | Kirchherr et al. |
| 2003/0039222 A1 | 2/2003 | Bae et al. |
| 2003/0123525 A1 | 7/2003 | Smee et al. |
| 2003/0138031 A1 | 7/2003 | Okubo et al. |
| 2003/0161339 A1 | 8/2003 | Oishi et al. |
| 2003/0185286 A1 | 10/2003 | Yuen et al. |
| 2004/0095990 A1 | 5/2004 | Gossett et al. |
| 2004/0228389 A1 | 11/2004 | Odenwalder |
| 2004/0267860 A1 | 12/2004 | Agami et al. |
| 2005/0047482 A1 | 3/2005 | Gossett et al. |
| 2005/0063327 A1 | 3/2005 | Kraus et al. |
| 2006/0062283 A1 | 3/2006 | Zhang et al. |
| 2006/0062284 A1 | 3/2006 | Li et al. |
| 2006/0109897 A1 | 5/2006 | Guo et al. |
| 2006/0146876 A1 | 7/2006 | Kim et al. |
| 2006/0159160 A1 | 7/2006 | Kim et al. |
| 2006/0251261 A1 | 11/2006 | Christoph |
| 2007/0019644 A1 | 1/2007 | Lee |
| 2007/0070952 A1 | 3/2007 | Yoon et al. |
| 2007/0086540 A1 | 4/2007 | Chae et al. |
| 2007/0147439 A1 | 6/2007 | Rhee et al. |
| 2007/0211766 A1 | 9/2007 | Horikoshi |
| 2008/0037673 A1 | 2/2008 | Ahn et al. |
| 2009/0185629 A1 | 7/2009 | Gossett et al. |
| 2009/0304048 A1 | 12/2009 | Gunter |
| 2010/0146229 A1 | 6/2010 | Yang et al. |
| 2010/0240382 A1 | 9/2010 | Sampath et al. |

FOREIGN PATENT DOCUMENTS

| | | |
|---|---|---|
| EP | 0588598 | 3/1994 |
| EP | 0940947 | 9/1999 |
| EP | 1047215 | 10/2000 |
| GB | 2022954 | 12/1979 |
| GB | 2276794 | 10/1997 |
| WO | WO 00/01091 | 1/2000 |
| WO | WO 00/01092 | 1/2000 |
| WO | WO 00/11838 | 3/2000 |
| WO | WO 02/47301 | 6/2002 |
| WO | WO 02/060081 | 8/2002 |
| WO | WO 02/065714 | 8/2002 |
| WO | WO 03/055092 | 7/2003 |
| WO | WO 2004/047329 | 6/2004 |

OTHER PUBLICATIONS

Chinese Office Action with English language translation issued Aug. 24, 2007 in Chinese Patent Application No. 200380107932.6, 13 pages.

Chinese Office Action with English language translation issued Jan. 25, 2008 in Chinese Patent Application No. 200380107932.6, 4 pages.

Chinese Office Action with English language translation issued Jun. 24, 2007 in Chinese Patent Application No. 200380107932.6, 15 pages.

Chinese Office Action with English language translation issued Jul. 3, 2009 in Chinese Patent Application No. 200380107932.6, 4 pages.

Chinese Notice of Allowance with English language translation issued Nov. 20, 2009 in Chinese Patent Application No. 200380107932.6, 4 pages.

(56) References Cited

OTHER PUBLICATIONS

Chinese Office Action with English language translation issued Apr. 13, 2011 in Chinese Patent Application No. 201010114392.6, 15 pages.
Chinese Office Action with English language translation issued Mar. 12, 2012 in Chinese Patent Application No. 201010114392.6, 33 pages.
Chinese Notice of Allowance with English language translation issued Jul. 4, 2012 in Chinese Patent Application No. 201010114392.6, 4 pages.
Database WPI Section EI, Week 200247 Derwent Publications Ltd. London, GB; AN 2002-441855 XP002246945 & KR 2002 002 034 A (Geosystems Inc.) Jan. 9, 2002.
Devalla b., et al. "Adaptive connection admission control for mission critical real-time communication networks," Military Communication Conference, 1998 MILCOM 98, Proceedings, IEEE Boston, MA Oct. 18-21, 1998 NY, NY pp. 614-620.
Keiler et al., "Efficient Linear Prediction for Digital Audio Effects," Proceedings of the COST G-6 Conference on Digital Audio Effects (DAFX-00), Verona, Italy, Dec. 7-9, 2000, pp. 1-6.
Lenstra, et al., "Analysis of Bernstein's Factorization Circuit," *Advances in Cryptology—ASIACRYPT 2002, 8th Int'l Conference on the Theory and Application of Cryptology and Information Security*, Queenstown, New Zealand, Dec. 1-5, 2002, 26 pages.
Newton, Harry, "Newton's Telecom Dictionary," ISBN # 1-57820-069-5, Malt Kelsey published, pp. 96-97.
Newton, Harry, "Newton's Telecom Dictionary," ISBN # 1-57820-069-5, Malt Kelsey published, pp. 17.
Newton, Harry, "Newton's Telecom Dictionary," ISBN # 1-57820-069-5, Malt Kelsey published, pp. 523.
Notice of Allowance issued in U.S. Appl. No. 09/772,110 issued on Jul. 27, 2005, 8 pages.
Notice of Allowance issued in U.S. Appl. No. 09/772,110 issued on Jan. 18, 2005, 8 pages.
Notice of Allowance issued in U.S. Appl. No. 10/015,013 issued on Jul. 3, 2008, 21 pages.
Notice of Allowance issued in U.S. Appl. No. 10/299,285 issued on Mar. 20, 2007, 9 pages.
Notice of Allowance issued in U.S. Appl. No. 10/402,878 issued on Jan. 29, 2009, 12 pages.
Notice of Allowance issued in U.S. Appl. No. 12/481,479 issued on Sep. 27, 2012.
Notice of Allowance issued in U.S. Appl. No. 12/356,791 on Nov. 9, 2012, 33 pages.
Office Action issued in U.S. Appl. No. 09/738,010 issued on Jan. 26, 2005, 19 pages.
Office Action issued in U.S. Appl. No. 09/738,010 issued on Mar. 10, 2004, 15 pages.
Office Action issued in U.S. Appl. No. 09/772,110 issued on Jan. 12, 2004, 13 pages.
Office Action issued in U.S. Appl. No. 09/772,110 issued on May 8, 2003, 21 pages.
Office Action issued in U.S. Appl. No. 10/015,013 issued on Feb. 5, 2008, 16 pages.
Office Action issued in U.S. Appl. No. 10/015,013 issued on Aug. 29, 2006, 12 pages.
Office Action issued in U.S. Appl. No. 10/015,013 issued on Mar. 12, 2007, 12 pages.
Office Action issued in U.S. Appl. No. 10/015,013 issued on Jul. 5, 2005, 16 pages.
Office Action issued in U.S. Appl. No. 10/015,013 issued on Jul. 7, 2004, 26 pages.
Office Action issued in U.S. Appl. No. 10/015,013 issued on Jan. 20, 2004, 12 pages.
Office Action issued in U.S. Appl. No. 10/299,285 issued on Aug. 28, 2006, 18 pages.
Office Action issued in U.S. Appl. No. 10/402,878 issued on Sep. 28, 2007, 13 pages.
Office Action issued in U.S. Appl. No. 10/402,878 issued on Feb. 21, 2007, 17 pages.
Office Action issued in U.S. Appl. No. 10/402,878 issued on Sep. 1, 2006, 17 pages.
Office Action issued in U.S. Appl. No. 10/943,677 issued on Jul. 17, 2008, 55 pages.
Office Action issued in U.S. Appl. No. 10/943,677 issued on Nov. 27, 2007, 21 pages.
Office Action issued in U.S. Appl. No. 11/972,321, issued on May 5, 2009, 13 pages.
Office Action issued in U.S. Appl. No. 12/481,479 on Apr. 13, 2012, 24 pages.
Office Action issued in U.S. Appl. No. 12/481,479 on Jun. 20, 2012, 11 pages.
Office Action issued in U.S. Appl. No. 12/356,791 on Mar. 26, 2012, 42 pages.
PCT International Search Report issued in PCT International Application No. PCT/US2001/046371 dated Dec. 17, 2002, 3 pages.
PCT International Search Report issued in PCT International Application No. PCT/US2001/047553 dated Feb. 6, 2003, 6 pages.
PCT International Search Report issued in PCT International Application No. PCT/US2002/000124 dated Oct. 4, 2002, 2 pages.
PCT International Search Report issued in PCT International Application No. PCT/US2002/039663 dated Apr. 11, 2003, 2 pages.
PCT International Search Report issued in PCT International Application No. PCT/US2003/036607 dated May 12, 2004, 3 pages.
PCT International Search Report and Written Opinion issued in PCT International Application No. PCT/US2010/020606 dated Jun. 2, 2010, 15 pages.
PCT International Preliminary Report on Patentability issued in PCT International Application No. PCT/US2010/020606 dated Aug. 4, 2011, 8 pages.
Roche, C., et al., "Performance of congestion control mechanisms in wormhole routing networks," INFOCOM '97, Sixteen Annual Joint Conference of the IEEE Computer and Communications Societies, driving the Information Revolution, Proceedings IEEE Kobe, Japan, Apr. 7-11, 1997, Los Alamitos, CA pp. 1365-1372.
Rodriguez-Fonollosa, Jose A., et al., signal Processing V. Theories and Applications, Elsevier Science Publishers B.V., 1990:A New Process for Adaptive IIR Filtering Based on the Log-Area Ration Parameters, p. 257-260.
Shan, Peijun, et al. DPS Research Laboratory Virginia Tech, The Bradley Department of Electrical and Computer Engineering, XP-0009322374 "FM Interference Suppression in Spread Spectrum Communications Using Time-Varying Autoregressive Model Based Instantaneous Frequency Estimation," p. 2559-2562.
Shynk, John J. "On Lattice-Form Algorithm for Adaptive IIR Filtering." XP-002236570 Department of Electrical & Computer Engineering University of California, Ch2561-9/88/0000/1554 1988 IEEE, p. 1554-1557.
Takawira, F. "Adaptive Lattice Filters for Narrowband Interference Rejection in DS Spread Spectrum Systems," Proceedings of the 1994 IEEE South African Symposium on Communications and Signal Processing, 1994, COM-SIG-94, Oct. 4, 1994, pp. 1-5.
Tianren, et al., "Vector Quantization Based Upon Bandpass Filtering Applied to Speech Recognition," Department of Electronic and Information Engineering, Hauzhong University of Science and technology, Wuhan, China CH2614-6/88/0000/1091, 1988 IEEE, p. 1091-1093.
Verdu et al., "Spectral Efficiency of CDMA with Random Spreading," IEEE Transactions on Information Theory, vol. 45, No. 2, Mar. 1999, 19 pages.
Zeidler, et al. "Frequency Tracking Performance of Adaptive Lattice Filters." Conference Record of the Twenty-Fifth Asilomar Conference on Signals, Systems and Computers, 1991, Nov. 4-6, 1991, vol. 2, pp. 643-649.

COMBINING SIGNALS WITH A SHUFFLED-HADAMARD FUNCTION

CROSS-REFERENCE TO RELATED APPLICATIONS

This application is a continuation of U.S. application Ser. No. 12/481,479, filed on Jun. 9, 2009. U.S. application Ser. No. 12/481,479, is (i) a continuation-in-part of U.S. application Ser. No. 10/402,878, filed Mar. 28, 2003, now U.S. Pat. No. 7,545,849; and (ii) a continuation-in-part of U.S. application Ser. No. 12/356,791, filed on Jan. 21, 2009, which is a continuation-in-part of U.S. application Ser. No. 10/943,677, filed Sep. 16, 2004, which is a continuation of U.S. application Ser. No. 09/730,697, filed Dec. 5, 2000, now U.S. Pat. No. 6,829,289. Portions of U.S. application Ser. Nos. 12/481, 479, 12/356,791, 10/943,677, 09/730,697 and 10/402,878, that are not inconsistent with this document are herein incorporated by reference.

TECHNICAL FIELD

This document relates generally to communication systems and methods and, more particularly, to wireless communications systems and methods.

BACKGROUND

Some wireless communications systems employ code division multiple access (CDMA) protocols. CDMA systems may receive digital data, encode the data in one step and spread the frequency of the encoded data in a second step. The encoding and spreading steps in such systems may consume a finite amount of time and processing power, and the ability with which a resulting coded and spread signal can communicate the received digital data over a medium may depend on various factors, such as physical characteristics of the medium, available processing power, and process gain that is applied in the encoding and spreading steps. In some systems, data from multiple channels may be multiplexed or otherwise combined into a single stream.

SUMMARY

This document describes systems, apparatus and methods for efficiently communicating multiple of channels of data from a transmitter to a receiver over a medium, in a single multiplexed stream. In particular, a transmitter can receive data from a number of input channels during each symbol period, which is itself divided into a number of chip periods. During each chip period, the transmitter can employ a multiplexer to select one of the different input channels, and a coder to code the received data from the selected channel. In some implementations, the transmitter employs a matrix of bits to control the multiplexer and the coder. In some implementations, the matrix of bits is derived from a Hadamard matrix whose rows have been randomly shuffled. A counter can index a different row in the matrix of bits during each chip period; and the transmitter can employ a first portion of the indexed row to select a particular channel (e.g., by controlling the multiplexer with the first portion) and a second portion of the indexed row to code the received data (e.g., by substituting the second portion in place of the received data during the current chip time). The counter can step through the matrix of bits, or a portion of the matrix of bits, during each symbol time, such that one bit of data from each channel is coded with multiple code bits and multiplexed into a single stream of data, which can be transmitted over a medium. A receiver can employ a similar counter and matrix of bits to decode and demultiplex data received via the medium.

The systems, apparatus and methods described in this document can provide one or more of the following advantages. Multiple data streams may be efficiently coded and multiplexed in one operation. In some implementations, the frequency content of the data stream can be simultaneously spread. Tradeoffs in process gain, throughput and signal-to-noise ratios can be efficiently made.

In one implementation, a computer-implemented method is disclosed that comprises receiving, at a transmitter, during a symbol time that comprises a plurality of chip times, a data value for each of a plurality of distinct data channel inputs; and during each chip time, (a) indexing a different row of a matrix of data bits, the matrix of data bits having a plurality of rows and a plurality of columns, (b) decoding one channel from the plurality of distinct data channel inputs using a first subset of one or more columns of the indexed row, (c) determining a code value for the decoded one channel from a plurality of possible code values that are derived from a second subset that is different than the first subset, the second subset comprising of one or more columns of the indexed row, and (d) providing the coded data value to a transmission circuit for transmission to a receiver. The method also involves performing (a) to (d) for each of the plurality of chip times in the symbol time.

In one aspect, the matrix of data bits comprises a first matrix that corresponds to a Hadamard matrix whose rows have been randomly or pseudo-randomly shuffled. Also, the matrix of data bits can comprise a compressed version of the first matrix having only columns with power-of-two indices from the matrix of data bits. Data values received from the plurality of distinct data channel inputs and bits in the matrix of bits can have binary values, and the first subset can comprise a number of columns corresponding to a base-2, logarithm of a number of data channel inputs in the plurality of distinct data channel inputs.

In other aspects, the method further comprises, at the receiver: for each chip time in the symbol time, (e) receiving a bit from a medium that couples the receiver to the transmission circuit, (f) indexing a different row of the matrix of data bits, (g) decoding one channel from a plurality of distinct data channel outputs, which correspond to the plurality of distinct data channel inputs at the transmitter, using the first subset of one or more columns of the indexed row, (h) comparing the received bit to each of the plurality of possible code values that are derived from the second subset; and outputting, for the symbol time and based on performing (h) for a plurality of bits for each decoded channel, a data value for each of the distinct data channel outputs. The method can also comprise synchronizing (a) indexing in the transmitter and (f) indexing in the receiver. Moreover, (c) determining the code value can comprise determining the code value based on the data value. In addition, the data value can be a binary value, and (c) determining the code value can comprise selecting a different portion of one of two columns of the matrix of data bits for each chip time, the one of two columns being selected based on the data value.

In yet other aspects, the data value has one of m possible predetermined values, and (c) determining the code value comprises selecting a different portion of one of m columns of the matrix of data bits for each chip time, the one of m columns being selected based on the data value. Furthermore, (c) determining the code value can comprise applying a logical function to bits in two or more columns having power-of-two indices in the matrix of data bits.

In yet another implementation, a system is disclosed that comprises a transmitter comprising: a plurality of data channel inputs that receive corresponding data channel input values during each symbol time, wherein each symbol time comprises a plurality of chip times; a coder that codes each data channel input value with a corresponding data channel code value; a multiplexer that selects a data channel code value for one of the data channel inputs during each chip time; and transmit circuitry that transmits the selected data channel code value during each chip time to a receiver. The system also comprises a receiver having: receive circuitry that receives data during each chip time, a demultiplexer that associates the received data with a particular data channel, a decoder that decodes data received during multiple chip times for each data channel, and a plurality data channel outputs that each provide decoded data for each data channel during a symbol time. The system can also include a controller that controls both the coder and the multiplexer based on a matrix of data bits.

In certain aspects, the controller controls the coder and multiplexer based on values in a different row of the matrix of data bits during each chip time. Also, the matrix of data bits can comprise a first matrix that is derived from a Hadamard matrix whose rows have been randomly or pseudo-randomly shuffled. In addition, the first matrix can comprise only columns having power-of-two indices from the Hadamard matrix whose rows have been randomly or pseudo-randomly shuffled. In other instances, the system further comprises a transmitter counter and a receiver counter that are synchronized and incremented during each chip time. The transmitter counter can index a row in the matrix of bits, and during each chip time, a first portion of indexed row can control the coder and a second portion of the indexed row can control the multiplexer.

In one aspect, the receiver counter indexes a row in the matrix of bits, and during each chip time, a first portion of the indexed row controls the demultiplexer. Also, the receiver can further comprise a plurality of correlators that are employed, over the course of each symbol time, by the decoder to decode received data for each data channel. Moreover, the plurality of correlators can calculate a correlation between received data and each of a plurality of possible data channel code values.

The details of one or more implementations are set forth in the accompanying drawings and the description below. Other features, objects, and advantages will be apparent from the description and drawings, and from the claims.

DESCRIPTION OF DRAWINGS

FIGS. 3A and 3B illustrate an example Hadamard matrix and certain properties thereof.

Like reference symbols in the various drawings indicate like elements.

DETAILED DESCRIPTION

This document describes systems, apparatus and methods for efficiently communicating multiple of channels of data from a transmitter to a receiver over a medium, in a single multiplexed stream. In particular, a transmitter can receive data from a number of input channels during each symbol period, which is itself divided into a number of chip periods. During each chip period, the transmitter can employ a multiplexer to select one of the different input channels, and a coder to code the received data from the selected channel. In some implementations, the transmitter employs a matrix of bits to control the multiplexer and the coder. In some implementations, the matrix of bits is derived from a Hadamard matrix whose rows have been randomly shuffled. A counter can index a different row in the matrix of bits during each chip period; and the transmitter can employ a first portion of the indexed row to select a particular channel (e.g., by controlling the multiplexer with the first portion) and a second portion of the indexed row to code the received data (e.g., by substituting the second portion in place of the received data during the current chip time). The counter can step through the matrix of bits, or a portion of the matrix of bits, during each symbol time, such that one bit of data from each channel is coded with multiple code bits and multiplexed into a single stream of data, which can be transmitted over a medium. A receiver can employ a similar counter and matrix of bits to decode and demultiplex data received via the medium.

Figure 1:
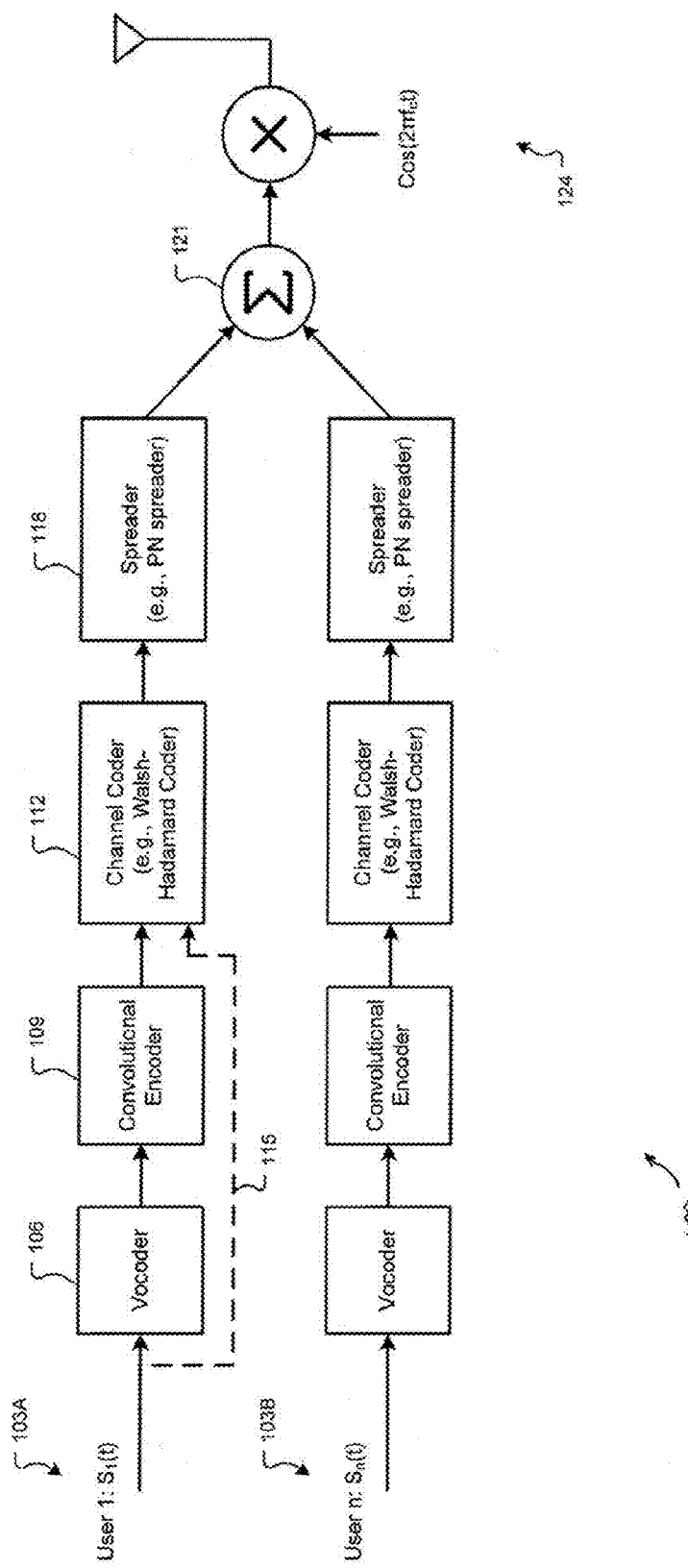
FIG. 1 shows an example wireless transmitter that employs separate channel and PN codes.
Figure 2:
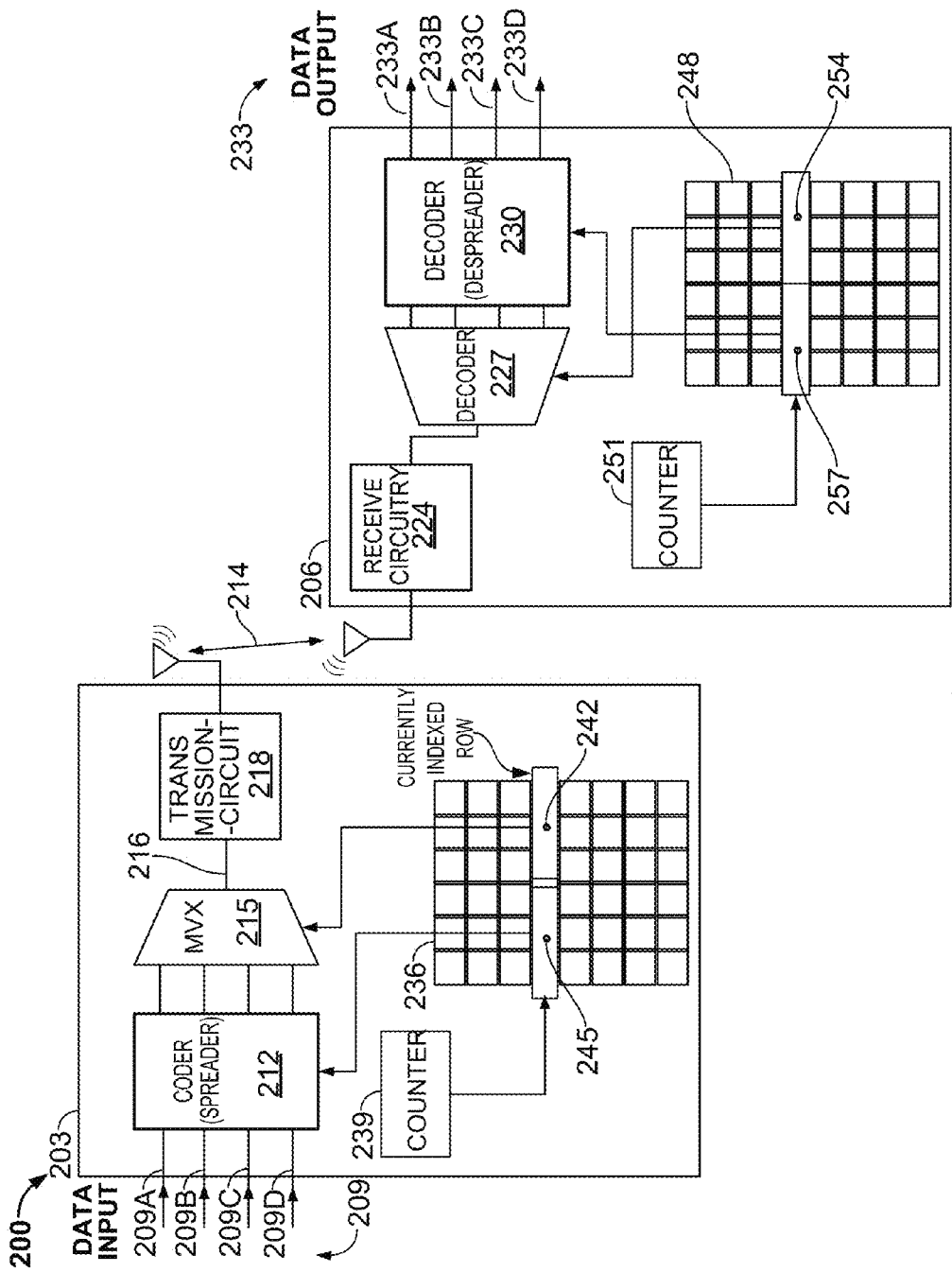
FIG. 2 illustrates an example system that can simultaneously multiplex data from multiple input channels, code the data and spread its frequency content.

FIG. 2 illustrates an example system that can, in one operation, multiplex data from multiple input channels, code the data and spread its frequency content. For context, FIG. 1 is first described, which illustrates a system 100 that codes, spreads and multiplexes data in three separate operations.

FIG. 1 shows an example wireless transmitter 101 that employs separate channel and pseudo-noise (PN) codes for coding and frequency-spreading data streams. A multiplexer can select between coded and frequency-spread channels. In particular, FIG. 1 shows user data signals 103A and 103B (e.g., speech signals), which can, in some implementations, be digitized by a vocoder 106 and encoded by a convolutional encoder 109. The vocoder 106 can both digitize and compress the voice signal 103A in various ways, and the convolutional encoder 109 can add information that can be subsequently employed for error correction.

In some implementations, each n bits of vocoded data that are input into the convolutional encoder 109 are translated into m symbols. For example, every two bits may be coded as a four-bit symbol; as another example, every four bits may be coded as an eight-bit symbols; etc. Symbols output from the convolutional encoder 109 can be further processed by a channel coder 112. In some implementations, each stream of data 103A and 103B can be coded with a different channel code by a channel coder (e.g., channel coder 112, which, in some implementations, is a Hadamard-Walsh coder). Channel coding each data stream with a different channel code can facilitate a system that accommodates many users on the same frequency, at the same time. In many implementations, each channel of data is assigned an orthogonal code, which can minimize the interference between channels. Once channel coded, the frequency content of each stream of data can be further spread, for example by a PN (pseudo-noise) spreader 118.

Multiple channels of information can be combined at a combiner 121, and the output of the combiner 121 can be used to modulate a carrier signal 124, which can be used to communicate the information through a physical medium. In other implementations (not shown), a single channel of data can transmitted, and the combiner 121 can be omitted.

An antenna and air interface are depicted in FIG. 1, but communication across other media are possible. For example, a carrier light signal could be modulated by the combined signal and driven through a fiber optic interface. Other carriers and media are possible.

In some implementations, incoming user data 103A may be already digitized data. (That is, the incoming data may be in a digital form, rather than in analog or pre-sampled audio form.) In such implementations, the vocoder 106 and/or convolutional encoder 109 may be bypassed, and the digitized data may be routed directly (e.g., along path 115) to the channel coder 112.

In the above-described example process, each step may add additional data, or process gain, to the original signal. For example 9,600 bits per second (bps) of data may be output by the vocoder 106, but every two bits from the vocoder 106 may be represented by a four bit symbol by the convolutional encoder 109, such that the convolutional encoder 109 outputs symbol data at a rate of 19,200 bps. Similarly, each bit of the symbol data may be combined with a 64-bit Walsh code, such that the resulting channel-coded symbols are part of a 1,228, 800 bps (1.2 Mbps) stream of data.

In some implementations, channel-coded data is combined with a spreading code having the same data rate. For example, a 1.2 Mbps stream of channel-coded data can be combined on a bit-by-bit basis (e.g., with an exclusive-OR function) with a 1.2 Mbps PN spreading code. In other implementations that employ a spreading code, the spreading code can add additional data, or process gain, to the output data stream. That is, in such implementations, each bit in the channel-coded data stream can be combined with multiple PN bits (e.g., 2, bits, 4, bits, 5, bits, 64, bits, etc.).

Overall process gain can be represented as a logarithm of a spreading ratio (e.g., the ratio of the bandwidth of the final processed signal (e.g., the spread, coded signal) to the bandwidth of the unprocessed input signal), and may be expressed in decibels. Thus, in one of the above examples, the process gain can be expressed as 1,228,800/9,600=128, or $10 \log_{10} (128)$=21 dB.

In some contexts, process gain can provide a useful indication of how effectively an output signal will convey the underlying information through a medium. Put another way, process gain can provide an indication of how resistant to noise and interference the output signal will be. Generally, the higher the process gain, the more noise in a medium a signal can tolerate as it is propagated through the medium. In addition, higher process gain may also indicate that a signal more closely resembles noise, spectrally, than a signal with a lower process gain.

As one will understand from the above example, process gain and bandwidth are generally inversely related at the individual channel level. Thus, output signals that are very immune to noise or interference may have less bandwidth than signals that are less immune to noise or interference. To put this more concretely, an output signal with twice the bandwidth and half the spreading ratio (e.g., a spreading ratio of 64, rather than 128—or $10 \log_{10}(64)$=18 dB, rather than $10 \log_{10}(128)$=21 dB) may be less immune to noise and interference. By balancing process gain with bandwidth parameters, a system designer can design a communication system to achieve particular reliability, noise or throughput specifications.

FIG. 2 illustrates an example system 200 that can simultaneously multiplex data from multiple input channels, code the data and spread its frequency content. As shown in the example of FIG. 2, the system 200 includes a transmitter 203 and a receiver 206. The transmitter 203 receives data from a plurality of input data channels 209A, 209B, 209C and 209D (collectively, "209"), codes the data with a coder 212 into a series of code chips, and multiplexes the data with a multiplexer 215. In some implementations, the multiplexer 215 interleaves the code chips; in other implementations, a series of code chips may be sent in sequence for each channel, effectively resulting in a time-division multiplexed system. Interleaving can, in some implementations, provide better protection against interference by spreading an individual channel's chips over a greater length of time. In some implementations, as described in greater detail below, the coder 212 codes the data in such a manner that also spreads its frequency content. A transmission circuit 218 transmits a single stream of multiplexed, coded (and optionally frequency-spread) data over a medium 221, to the receiver 206.

In some implementations, data may be transmitted in binary form, without the need for a carrier signal. For example, binary data may be converted to an analog signal (e.g., a one-volt signal), and the analog signal may be used to directly drive an antenna, as is described in more detail in U.S. application Ser. No. 09/772,110, filed Jan. 26, 2001, now U.S. Pat. No. 6,982,945. In some implementations, the transmitter employs a transmission circuit such as the one shown in and described with reference to FIGS. 4A and 4B of U.S. application Ser. No. 10/402,878.

The transmitter 203 can receive new data on each input channel 209 during each symbol period. During each chip period (e.g., an integer fraction of the symbol period), the transmitter 203 can transmit a portion of a representation of one of the channels. How large a portion is transmitted can depend on various factors, such as the process gain applied to each channel, the relative length of the symbol period and the chip period (or put differently, the relative symbol and chip frequencies), the number of channels, the symbol size, and other factors. The representation (e.g., the coded version of the input data) may be a Walsh code or portion of a Walsh code, or be derived from a Walsh code (or a Hadamard matrix, which, in some implementations can be used to generate Walsh codes—both Walsh codes and Hadamard matrices are addressed in more detail below).

For purposes of illustration, four data inputs 209 are illustrated in FIG. 2. In a system in which data is input in one-bit symbols on each channel during each symbol time, and each channel of data is represented as four code bits that are interleaved into a single stream, the transmitter can transmit sixteen bits during each symbol period—one bit during each chip period—to transmit the four channels one-bit channels of data. This is merely one example. The reader will appreciate that the concepts described herein can be readily extended to systems having varying numbers of channels, symbol sizes, process gains, etc.

The reader will note that in other contexts, "chip period" may correspond more directly to a number of code bits employed to represent a symbol of data on a single input channel; as used herein, "chip period" can also be related to a number of channels. Thus, in the above example in which one-bit input symbols are represented by four code bits, the chip period may be one-sixteenth of the symbol period (rather than one-fourth), given that there are four channels.

The receiver 206 includes a receive circuit 224 that receives a stream of data via the medium 221, demultiplexes the stream of data with a demultiplexer 227, and decodes (and effectively despreads) the data with a decoder 230 into a number of output channels 233A, 233B, 233C and 233D (collectively, "233") that correspond to the input channels 209.

In some implementations, the coder 212 and multiplexer 215 can be controlled by a matrix of bits 236. A counter 239 can index a different row in the matrix of bits 236 during each chip time. A first portion 242 of the indexed row can control the multiplexer 215, and a second portion 245 of the indexed row can control the coder 212. Additional details of controlling the multiplexer 215 and coder 212 with the matrix of bits 236 are provided with reference to FIG. 4 below.

At the receiver 206, a similar matrix of bits 248 as the matrix 236 employed by the transmitter 203 can control the demultiplexer 227 and decoder 230. In particular, a corresponding counter 251 can index a different row of the matrix of bits 248, and more specifically, a first portion 254 of an indexed row of the matrix 248 can control the demultiplexer 227 and a second portion 257 can control the decoder 230.

The matrix 236 in the transmitter 203 and the matrix 248 in the receiver 206 can store common values, and their corresponding counters 239 and 251 can be synchronized in various manners, which are not described here in detail, such that the same row of a common matrix that is used to code and multiplex data at the transmitter 203 is also used at the receiver 206 to demultiplex and decode corresponding data transmitted over the medium 221.

In some implementations, a large matrix is stored in a memory device in each of the transmitter 203 and receiver 206, and only a portion of the matrix is employed for any given transmitter-receiver pair, of which one pair is depicted in the various figures. In such implementations, a large number of transmitters and receivers can be similarly programmed, and a small amount of data can be communicated between individual transmitter-receiver pairs to coordinate which portions of the matrix are to be used for the operations described herein. Such implementations can facilitate a flexible and dynamically configurable system for communicating data between a large number of devices.

As indicated above, the matrix of bits 236 is selected in some implementations such that data input to the transmitter 203 is effectively coded, multiplexed and spread, as it might be in other CDMA systems (e.g., such as the system 100 of FIG. 1, in which these operations may be separately performed). In some implementations, the matrix of bits 236 (and corresponding matrix 248) is derived from a Hadamard matrix whose rows have been randomly shuffled. In some implementations, each transmitter or receiver stores only a portion of a shuffled Hadamard matrix (e.g., only columns having power-of-two indices). For additional context, various aspects of Hadamard matrices (and Walsh codes) are now described.

In some implementations, Walsh functions provide useful initial code bits. The bits in such Walsh functions can be randomly or pseudo-randomly shuffled, which may improve the usefulness of such functions for coding data as is described above.

Walsh functions can be generated using an iterative process of constructing a Hadamard matrix. Starting with $H_1=[0]$, the Hadamard matrix can be built by:

$$H_{2n} = \begin{pmatrix} H_n & H_n \\ H_n & \overline{H_n} \end{pmatrix}$$

For example, the Walsh codes of lengths two and four are shown respectively as:

$$H_2 = \begin{pmatrix} 0 & 0 \\ 0 & 1 \end{pmatrix}$$

$$H_4 = \begin{pmatrix} 0 & 0 & 0 & 0 \\ 0 & 1 & 0 & 1 \\ 0 & 0 & 1 & 1 \\ 0 & 1 & 1 & 0 \end{pmatrix}$$

From the corresponding matrices shown above, the Walsh codewords are given by the columns (or rows, given that an unshuffled Hadamard matrix is symmetrical about its main diagonal). These Walsh codes can be useful given that they are orthogonal to each other. As such, different signals can be coded by different orthogonal Walsh codes, then transmitted over the same frequency channel, and the different signals can be recovered at the receiving end using the same orthogonal Walsh codes.

Two additional properties of Walsh codes, and of Hadamard matrices from which the Walsh codes can be generated, are now described. First, Hadamard matrices have a property that enables them to be stored in compressed form. In particular, as is described in more detail below, only the power-of-two columns need to be stored; the rest of the columns can be dynamically determined from the power-of-two columns. Second, although short Walsh codes have not typically been employed as spreading codes, longer Walsh codes can be so employed, particularly after the bits in the Walsh codes have been shuffled, as described in more detail below.

Figures 3A, 3B:
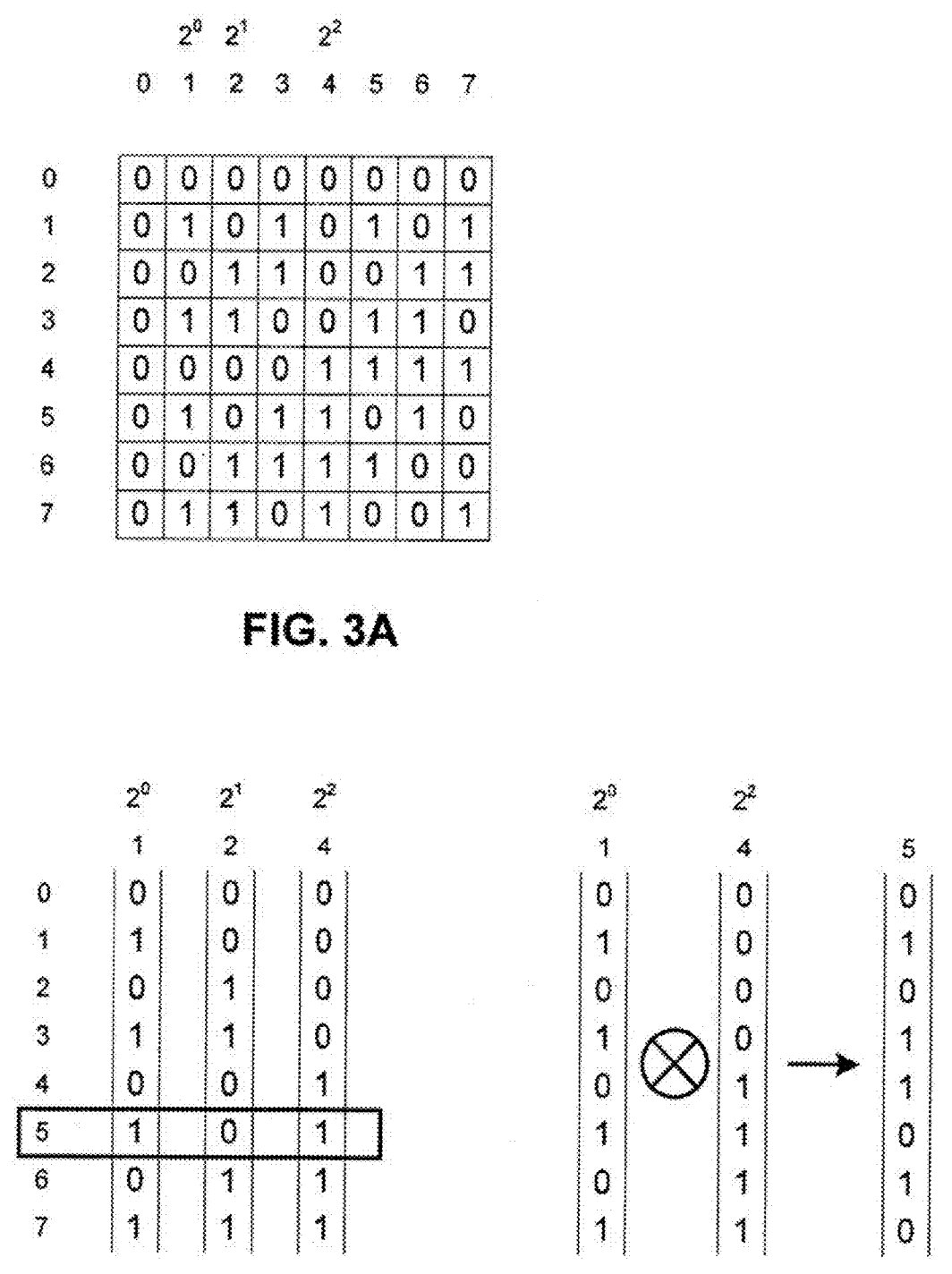

Storing Hadamard matrices in compressed form is now described. Any column of a Hadamard matrix can be dynamically generated from the power-of-two columns of the Hadamard matrix, as is depicted in FIGS. 3A and 3B. For purposes of referencing particular columns in this description, an 8×8, Hadamard matrix is shown in FIG. 3A, and this matrix can be generated in the iterative manner described above, or in any other appropriate manner. Each column and row is indexed from 0 to 7, and the power-of-two columns (i.e., the columns having an index that is a power of two) are indicated as such.

To generate a column having a particular index from the power-of-two column(s), an exclusive-OR function can be applied to the power-of-two columns whose values are '1' in the row corresponding to the particular index of the desired column. Thus, with reference to FIG. 3B, to generate column [5], the rows corresponding to row index 5 in each of the power-of-two columns can be inspected, and an exclusive-OR function can be applied to those power-of-two columns having a '1' in the [5] row. In this example, the "$2^0$" and "$2^2$" columns have a '1' in row [5], so an exclusive-OR function can be applied (e.g., cell-by-cell, in each row) to these columns to dynamically generate column [5], as shown. This same process can be applied to generate any other column of the matrix.

In the preceding example, the Hadamard matrix is small, and relative to the small size, it may be efficient to store all columns of the matrix, rather than dynamically generating columns that are not power-of-two columns. For larger Hadamard matrices, however, storing the Hadamard matrix in compressed form can significantly reduce the size of memory needed to store the matrix. For example, a Hadamard matrix having dimensions $2^N \times 2^N$ can be stored as a $2^N \times N$ matrix. For N=13, compressing the Hadamard matrix as described above results in a matrix having 8192×13 entries (e.g., just under 128K entries), rather than the 8192×8192 entries (~56M entries) that the matrix would have in uncompressed form. Compression in this manner with N=13 results in a matrix that is about 630 times smaller than its uncompressed counterpart.

Modifying the above-described Hadamard matrix in a manner that improves its ability to perform a spreading function is now described. As indicated above, Walsh codes (e.g., the columns of a Hadamard matrix) are not generally employed to spread the spectral content of a data signal. In part, this may be because the spectral density of many standard Walsh codes is concentrated in a small number of discrete frequencies—as may be evident from inspection of the example 4×4 and 8×8 Hadamard matrices above and in FIG. 3A, respectively—and more particularly, from the observation from these matrices that several columns have regular patterns of bits (resulting in a concentration of energy at discrete corresponding points within the frequency domain). However, by randomly, or pseudo-randomly shuffling the rows of the Hadamard matrix, desirable properties of the Hadamard matrix can be maintained (e.g., the orthogonal nature of the columns relative to each other, as is described in greater detail below), and the spreading ability of the matrix can be improved—resulting in a shuffled-Hadamard matrix that can be used for both coding and spreading.

Properties of a Hadamard matrix whose rows have been randomly shuffled are now briefly discussed. First, with respect to the compressibility described above, because any column of a Hadamard matrix can be dynamically generated by applying an exclusive-OR function to certain power-of-two columns on a row-by-row basis, and since shuffling rows affects each column in the row, shuffling has no impact on the column values, relative to each other, within any given row. Accordingly, whether the rows are shuffled or not, the Hadamard matrix can be compressed as described above.

Second, with respect to the orthogonality of the columns in the Hadamard matrix relative to each other (which can enable the columns to be used as channel codes), shuffling the rows affects each column, such that each column code is modified but in a manner that maintains the orthogonality of the columns relative to each other.

Third, randomly shuffling the rows has a similar effect as modulating with a PN a channel-coded signal in a conventional system—namely the random shuffling can introduce considerable spectral diversity to the code, and that diversity can increase as the length of the code increases (i.e., as the number of rows in the Hadamard matrix increases). Thus, by using a sufficiently long code (e.g., on the order of 8K, 4K, 1K, 512 bits, 256 bits, 128 bits, etc.), drawn from a correspondingly dimensioned Hadamard matrix with randomly shuffled rows, a data signal can be effectively channel-coded and spread simultaneously.

Figure 4:
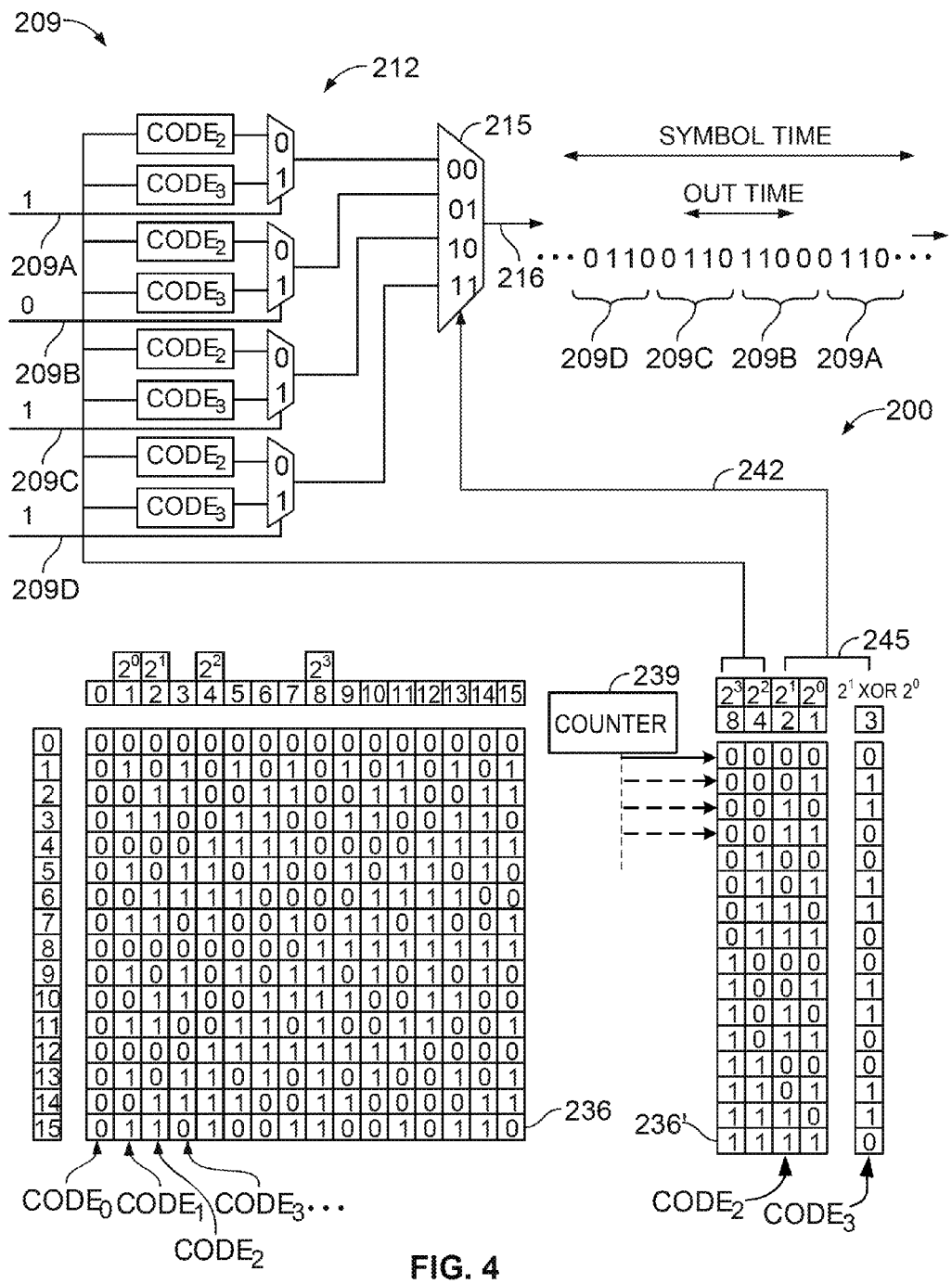
FIG. 4 illustrates additional detail of the example system shown in FIG. 2.

FIG. 4 illustrates additional detail of the system 200 shown in FIG. 2. In particular, FIG. 4 illustrates an unshuffled 16×16 Hadamard matrix 236, and a compressed version 236' of the same (where only the columns having power-of-two indices are stored). Each column of the Hadamard matrix 236 can be used to provide (or generate, in the case of the compressed matrix 236') code bits for coding data received from the input data channels 209.

For purposes of reference, various columns are referred to herein as $CODE_0$, $CODE_1$, $CODE_2$, $CODE_3$, etc. Thus, $CODE_3$, refers to column 3 of the full Hadamard matrix 236. From the compressed Hadamard matrix 236', columns having indices other than powers-of-two, such as column 3, can be generated (e.g., dynamically at the transmitter or receiver) by applying, bitwise, an exclusive-OR function to appropriate power-of-two columns, as described above. Thus, to generate column 3, an exclusive-OR function can be applied, bit-wise, to columns 2 and 1— both of which are included in the compressed matrix 236'.

In some implementations, such as the one depicted in FIG. 4, the same codes can be employed to code each channel of data. In particular, for example, codes 2 and 3 are used to encode data on each of the data channels 209A, 209B, 209C, and 209D. Coding can include selecting between the relevant codes based on the value of the data channel input. Thus, in the example depicted, code 2 (or a portion thereof) can be employed for any channel that has a value of '0, ' and code 3 (or a portion thereof) can be employed for any channel that has a value of "1. " In this manner, one portion 245 of the matrix 236' can be employed to code incoming data.

In this example, each data channel provides a single bit of data during each symbol time. In other implementations, each data channel may provide multiple bits of data, in which case more than two codes can be employed to code the data. For example, if a symbol of input data includes two bits, the two bits could be used to select one of four different codes; if a symbol of input data includes three bits, the three bits could be used to select one of eight codes; etc. Any suitable mapping between data symbols and corresponding codes can be employed.

Coded data from each channel can be selected for incorporation into a single stream of data by the multiplexer 215, and the multiplexer can be controlled by another portion 242 of the matrix 236'. That is, other columns of a counter 239-indexed row of the matrix 236' can select a particular multiplexer input, corresponding to a different data channel. Thus, in the example shown, when the counter 239 indexes any of the first four rows of the matrix 236', columns 8 and 4 (the portion 242 of the matrix 236', in this example) have values of "00, " enabling the coded version of channel 209A to be passed through to the output 216; when the counter 239 indexes any of the last four rows of the matrix 236', columns 8 and 4 have values of "11, " enabling the coded version of channel 209D to be passed through to the output 216; etc.

By operating the counter at an appropriate chip rate, and employing the portions 242 and 245 of the matrix 236' as described above, data at the data input channels 209A-D can be processed during each symbol time in a manner that codes and multiplexes the data, using the matrix 236'.

Because of the multiplexing, only a portion of the relevant code is used to represent data values received from each data input channel. Thus, in this example, because there are four channels, only one-fourth of the code (e.g., $CODE_2$ or $CODE_3$) is used to encode data for any given channel. In this example, such short portions of the code may be difficult to correlate properly at the receiver 206, and the coded data may be susceptible to corruption in the medium 221. However, making the codes sufficiently long relative to the number of channels can overcome any such limitations, and a system designer can tailor the code length (which, in some implementations, corresponds to the size of a Hadamard matrix that is employed to generate the codes) to set the process gain to a level sufficient to achieve a desired level of noise resistance or correlation efficiency.

The examples above describe first coding input data, then multiplexing the data; and the figures show physical components that perform each function. The figures and descriptions are provided for purposes of explanation only. In some implementations, the steps of coding and multiplexing (and spreading, as described in more detail below) can be actions of routing particular bits from the matrix 236 (or 236') to an output, where the particular bits are drawn from particular columns of a counter 239-indexed row of the matrix. That is, in some implementations, logic associated with a memory device that stores the matrix can essentially perform the various operations simultaneously, or nearly simultaneously.

At the receiver 206, a similar matrix 248 can be employed to control the demultiplexer 227 and decoder 230 (see FIG. 2). That is, the counter 251, when appropriately synchronized with the counter 239, can index a row of the matrix 248, and use a portion 254 of the indexed row to determine which channel to assign an incoming bit received from the medium. Another portion of the index row can be employed to identify possible expected code values against which to correlate an incoming bit.

Correlating incoming bits to expected values can be performed over the entire symbol period. For example, as the counter 251 indexes rows in the matrix 248, bits corresponding to portions of the possible codes can be stored in a correlator, as well as the incoming bits. After a sufficient number of bits have been received for a particular channel, and a sufficient portion of the possible codes against which to correlate the received bits have been stored, the correlation can be made. In particular, for example with reference to FIG. 4, after the counter 239 has stepped through the first four rows of the matrix 236', coded data for channel 209A will have been sent. In particular, bits "0110" will have been output (that is, the first four bits of $CODE_3$). At the receiver 206, assuming no corruption in data within the medium 221, and assuming that the transmitter 203 and receiver 206 are synchronized, the value "0110" will be received, and a correlator (not shown in FIG. 4) at the receiver 206 will be able to compare the received data "0110" to "0011"(the first four bits of $CODE_2$) and "0110"(the first four bits of $CODE_3$)—the only two expected values for data for channel 209A. The correlator will determine a match with $CODE_3$(or calculate a stronger correlation, as outlined below) and determine that the transmitter 203 sent a coded representation of a '1' for data channel 209A. Accordingly, the receiver 206 will output a '1' at data output 233A for the corresponding symbol time. This process can be repeated for other data channels within the symbol time, and for other symbol times.

An example correlation process is further described with reference to FIG. 5. For purposes of illustration, the example illustrated in FIG. 5 assumes that eight received bits ("11001111") are to be correlated to one of four possible symbols employed by the transmitter ("00110011", "00001111", "01011010", and "00111100"). The example further assumes that two bits have been corrupted. In particular, the example assumes that the transmitter sent "00001111," but that the receiver received "11001111." Finally, this example assumes that the receiver 206 has already demultiplexed received bits into a single channel (as well as the possible code bits, which may have been dynamically stored in temporary memory associated with the correlators) as the counter 251 indexed the matrix of bits 248. The correlators themselves may be included in the decoder 230 shown in FIG. 3.

Figure 5:
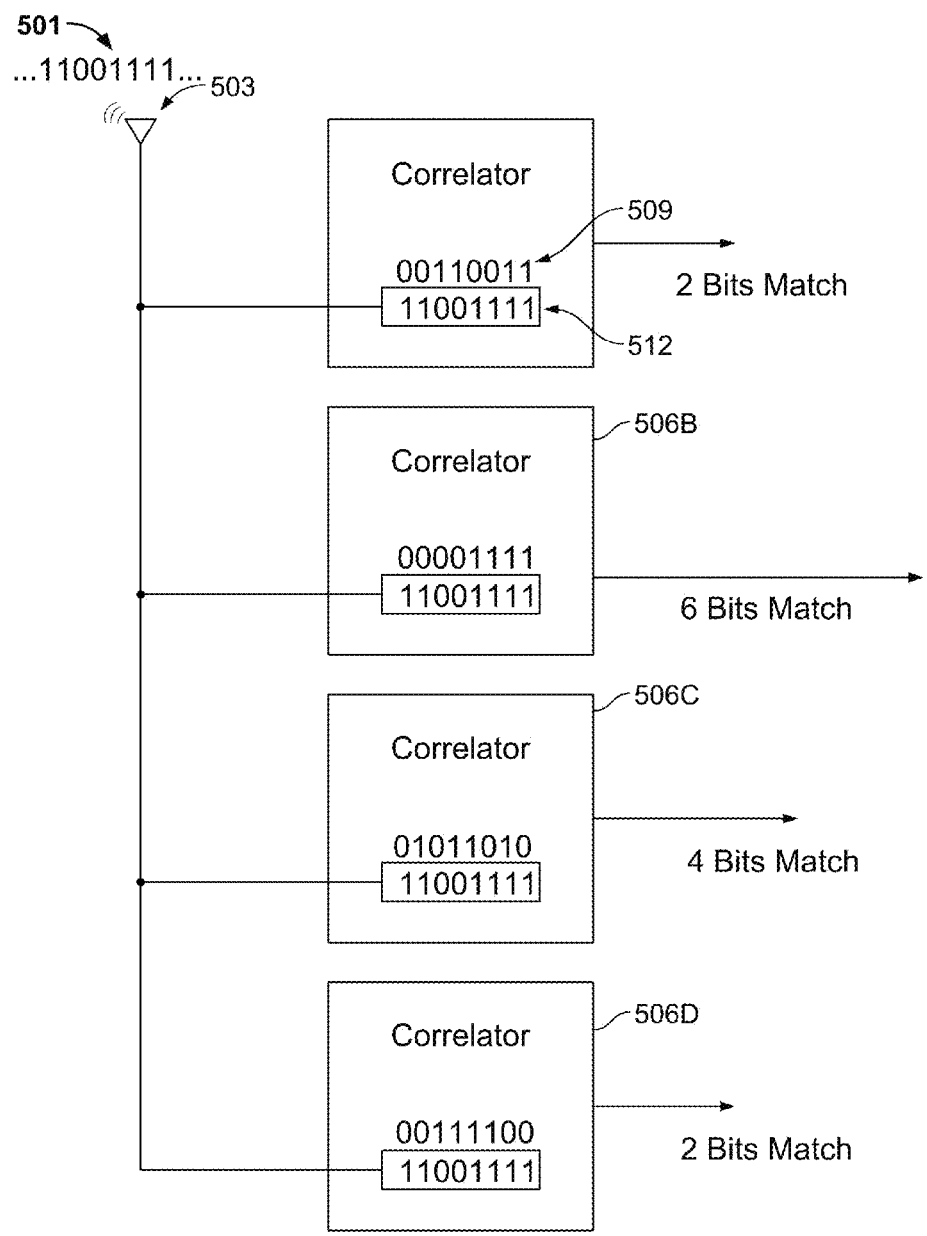
FIG. 5 illustrates an example correlation process.

FIG. 5 provides a pictorial representation of one example method of correlating received data to possible code bits that may correspond to the received block of data. The reader will appreciate that this description represents a conceptual simplification to graphically illustrate one of many possible mathematical and algorithmic methods of correlating two different signals. Any appropriate correlation method can be employed.

As depicted in the example of FIG. 5, incoming data (e.g., the data 501 ("11001111"), which was described above as being subjected to interference) is received by a receive circuit 503. The incoming data can be provided to each of a number of correlators 506A, 506B, 506C and 506D, as shown, and each correlator can compare the incoming data to a different possible set of code bits (e.g., code bits that a corresponding transmitter may have employed in transmitting the data).

As shown in this example, correlator 506A compares the incoming data to code bits "00110011"; correlator 506B compares the incoming data to code bits "11001111"; and so on. In one implementation, each correlator 506A-D may determine how many bits of the incoming data match corresponding bits in the possible symbol; in other implementations, a more complex correlation process is performed. For purposes of illustration, a simple number-of-matching-bits-comparison is depicted. In this illustration, six bits of incoming data match corresponding bits in correlator 5068, while only four or two bits of the incoming data match in correlators 506A, 506C or 506D. Thus, in this example, the correlators 506A-D would determine that the incoming data is most strongly correlated with code bits "00001111." Other circuitry coupled with the correlators 506A-D can cause output to be provided that corresponds to whatever data value was coded as "00001111" at the transmitter.

Returning to the example of coding individual bits of data with portions of either $CODE_2$(in the case of a '0' on the corresponding transmitter data channel) or portions of $CODE_3$(in the case of a '1' on the corresponding transmitter data channel), determination by correlators that $CODE_3$ is most strongly correlated with received data for a particular channel can result in a '1' being output at the receiver for that channel.

Using a correlation process like the one described above (or any other suitable correlation process), transmitted data can be recovered at the receiver 206, even if individual code bits are corrupted during the transmission process through the medium 221. As the reader will appreciate, the more code bits that are used to code a particular number of data bits (or put another way, the greater the process gain), the more resistant a system may be to noise or other data corruption.

Figure 6A:
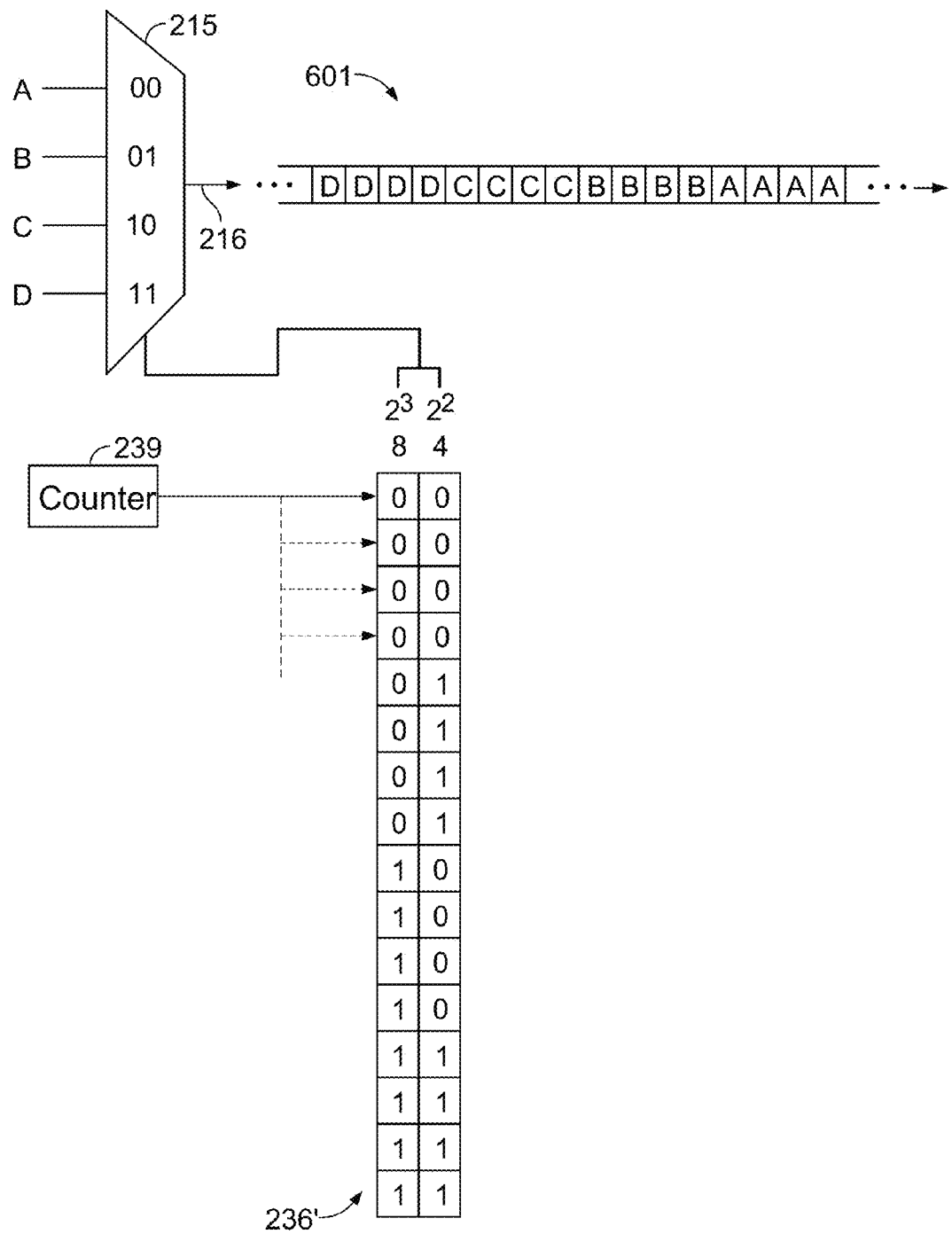
FIGS. 6A and 6B illustrate effects of randomly shuffling the matrix of data bits that is shown in FIG. 2.

So far, examples have been provided in which an unmodified Hadamard matrix is employed for coding and multiplexing, or for demultiplexing and decoding. In the examples provided, code bits for particular data channels are positioned as consecutive bits within a symbol time. Thus, with reference to FIG. 6A, which provides additional detail for the system shown in FIG. 2 (in FIG. 6A channels are referred to as 'A,' 'B,' 'C,' and 'D' for simplicity, rather than 209A, 209B, 209C, and 209D), the output data stream 601 provides code bits first for channel A, then for channel B, and so on, as the counter 239 steps through each row of the matrix 236' (only a portion of which is shown in FIG. 6A). Concentrating coded channel data in this manner can increase the chance that interference will disrupt an entire channel of data.

Figure 6B:
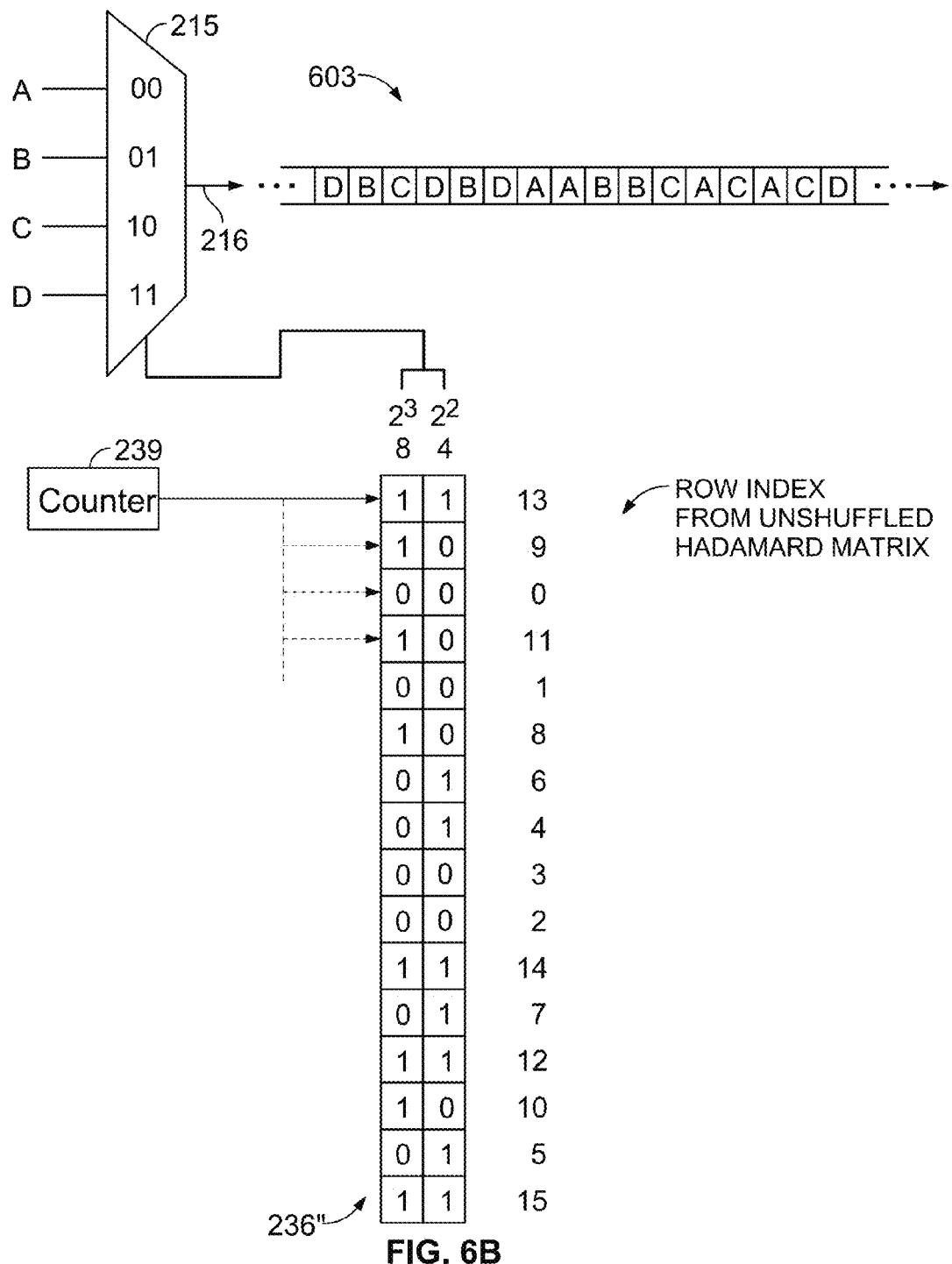

To increase the robustness of the system, code bits for the different channels can be interleaved (e.g., randomly). One method of randomly interleaving code bits for the different channels is to randomly shuffle the rows of the matrix 236' that is used to control the multiplexing, as shown in FIG. 6B. FIG. 6B shows a portion of a shuffled matrix (matrix 236") that can be used to control the multiplexer, as well as a resulting data stream 603. As depicted, the output data stream 603 includes interleaved code bits for the data channels. That is, one code bit is provided for channel D, followed by a code bit for channel C, followed by a code bit for channel A, and so on.

Such interleaving can increase the robustness of individual channels by reducing the chance that a short burst of interference (e.g., interference over several chip times) will affect all code bits for a particular channel. Moreover, the interleaving may have the affect of spreading the frequency content of the output stream by minimizing patterns in the data that might otherwise result from consecutive transmission of code bits for each channel. For example, in an un-interleaved/un-shuffled implementation, transmission in the manner described above of the same value for each data channel would result in the same code-bit pattern being sent four times; such a regular pattern would have particularly focused frequency content. Such a scenario is less likely if the code bits for each channel are interleaved in implementations in which a randomly shuffled matrix 236" is employed to multiplex code bits from various channels.

Randomly shuffling the rows of the matrix of bits 236' can result in the codes themselves having frequency content that is spread out more than codes drawn from a matrix of bits 236 (e.g., a Hadamard matrix) with unshuffled rows. For example, referring back to coding data channels with portions of $CODE_2$ or portions of $CODE_3$, unshuffled portions of these codes may have regular patterns of bits and correspondingly focused frequency content. In contrast, shuffled codes may have more random patterns of bits, which can tend to spread the frequency content farther out.

The reader will appreciate that for the codes drawn from a matrix of bits that is derived from a Hadamard matrix with randomly shuffled rows to provide any spreading function, far more than four code bits per data bit will generally be needed. That is, in practice, Hadamard matrices of dimension far greater than 16×16 may be advantageously employed. For example, an 8k×8k Hadamard matrix may be employed such that each code (e.g., $CODE_3$ or $CODE_2$ in the example above) has 8192 bits. For a system having four channels, as described above, 8192/4=1024 code bits would be employed to code each channel of data for any given symbol time. In contrast to four bits, 1024 bits may be sufficient to provide a spreading function, particularly in conjunction with the additional spreading that inherently results from randomly interleaving the channels, as is described above. Thus, in some implementations, if a sufficiently dimensioned shuffled-Hadamard matrix is employed, data from multiple channels can be effectively and efficiently coded, multiplexed and spread. Moreover, by adjusting the length of each code (e.g., the size of the underlying shuffled-Hadamard matrix, or portion that is used), the symbol rate, the symbol size, the chip rate, and other system parameters, a system designer can achieve various design goals and tradeoffs between process gain, signal-to-noise ratio, throughput, etc.

Figure 7:
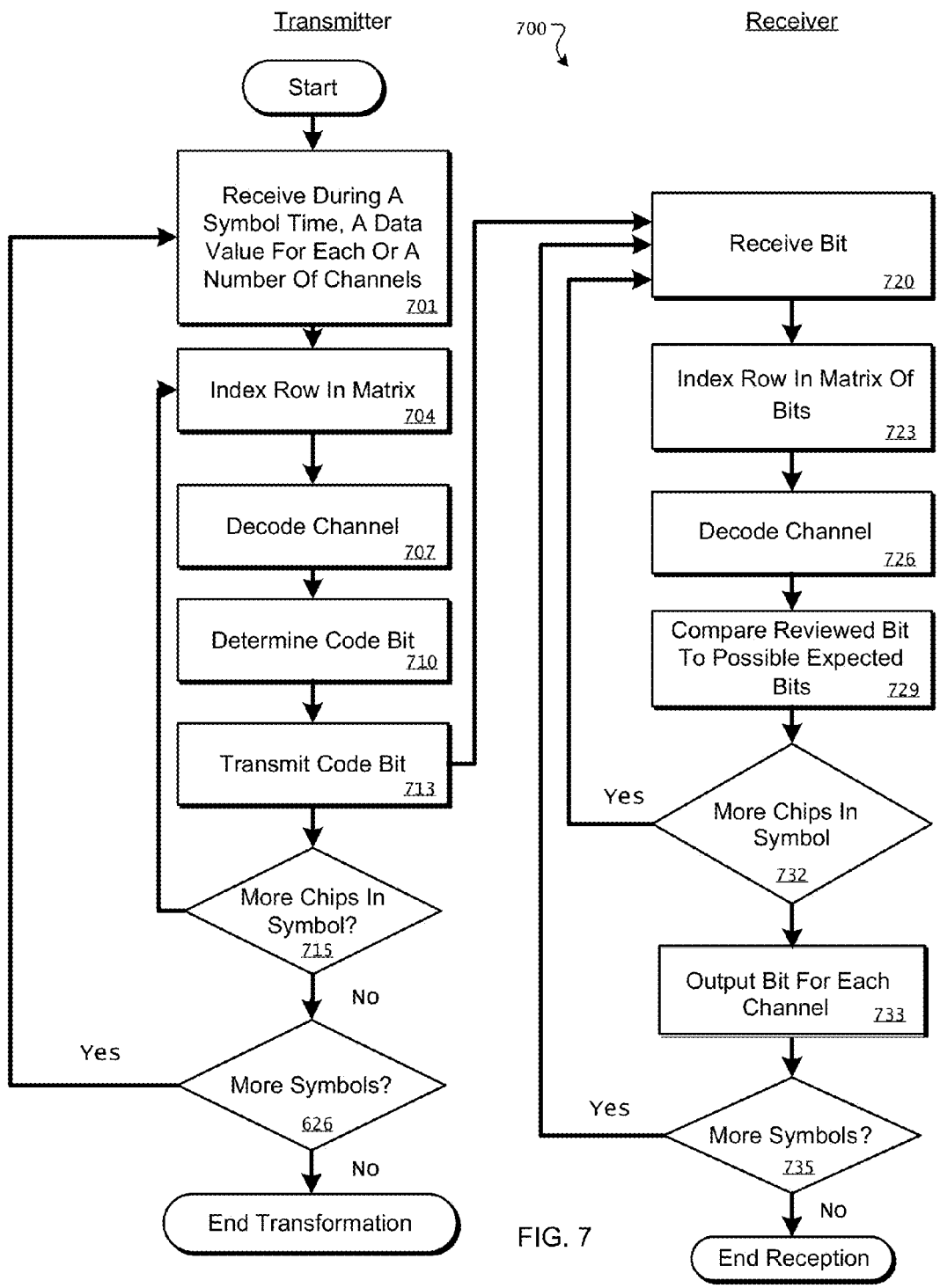
FIG. 7 is a flow diagram illustrating a method of transmitting and receiving coded, multiplexed data.

FIG. 7 is a flow diagram of an example method 700 by which data can be received from multiple channels at a transmitter, and coded, multiplexed and transmitted to a receiver, where it can be demultiplexed and decoded. The method 700 is depicted as being performed partially at a transmitter (e.g., the transmitter 203, shown in FIG. 2) and partially at a receiver (e.g., the receiver 206, shown in FIG. 2). In some implementations, the method can be employed in other devices; the devices can be arranged in other ways; and various actions can omitted, added or reordered. The method 700 is now described with reference to the previous figures.

As shown, the method 700 includes receiving (701), during a symbol time, a data value for each of a number of channels. For example, with reference to FIG. 2, the transmitter 203 can receive a data bit for each of the channels 209A-D for a particular symbol time.

For each chip time in the symbol time, the method 700 includes indexing (704) a row in a matrix of data bits, decoding (707) a channel, determining (710) a code bit, and transmitting (713) the code bit. In particular, the counter 239 can increment once during each chip time, and a value of the counter can be used to index (704) a particular row in the matrix of bits 236, which, in some implementations is a Hadamard matrix with randomly shuffled rows, which is stored in compressed form in a memory device associated with the transmitter 203.

A portion 242 of the indexed row (e.g., two columns of the matrix 236, or of a compressed version 236' of the matrix) can be used to decode (707) a particular channel. That is, the bits in the columns corresponding to the portion 242 can be employed to control the multiplexer 215. More particularly, for the system 200 of FIG. 2, a portion 242 of the indexed row having a value of "00" can cause channel 209A to be decoded; a portion 242 of the indexed row having a value of "01" can cause channel 209B to be decoded; etc.

Another portion 245 of the indexed row (e.g., one of a number of different columns that are employed to supply code bits) can be used to determine (710) a code bit for the current chip time and decoded channel. This is represented pictorially in FIG. 2 with a coder 212, but an actual implementation may physically route a particular bit from the matrix 236 or 236' to a transmission circuit 218. The transmission circuit can physically transmit the bit over the medium 221, to the receiver 206. In some implementations, the transmission circuit transmits the bit directly, without employing a carrier signal (e.g., by converting the bit to an analog signal and driving an antenna with the analog signal). Other implementations employ other suitable methods for transmitting the bit.

The method 700 includes determining (715) whether there are more chips to process for a given symbol. In particular, the transmitter 203 can determine whether the counter 239 has stepped through all relevant rows of the matrix of bits 236 or 236'. If not, the method continues indexing (704), decoding (707), determining (710) code bits, and transmitting (713) the code bits, until the appropriate number of code bits have been transmitted for each data channel, for a given symbol.

The method includes determining (717) whether additional symbols are to be processed and proceeds accordingly. For example, the transmitter can continue processing data values on the input channels 209A-D as long as new data is provided to the transmitter.

On the receiver end, the method 700 includes, for each chip time in a given symbol time, receiving (720) a bit, indexing (723) a row in a matrix of data bits, decoding (726) a channel, and comparing (729) the received bit to possible expected bits.

In particular, the receive circuitry 224 at the receiver 206 can receive (720) bits that are transmitted from the transmitter 203, through the medium 221. The counter 251 can increment once during each chip time, and a value of the counter 251 can be employed to index (723) the matrix of bits 248. As indicated above, the matrix 248 can correspond to the matrix 236 or 236' in the transmitter, and the counter 251 and the counter 239 can be appropriately synchronized.

A portion 254 of the indexed (723) row can be employed to decode a channel, in a similar manner as is described above with reference to the transmitter 203. Another portion 257 of indexed row can be employed to decode the received bit. More particularly, the other portion 257, which may include multiple columns that provide possible code bits for a data value at the transmitter, can be employed to load temporary memory associated with a correlator. With reference to FIG.

5, for example, a reference portion 509 of each correlator 506A-D can be progressively loaded with a value from each column in the indexed row that provides a possible expected code bit. A comparison portion 512 of each correlator can be progressively loaded with a copy of the received bit value. In this manner, as the counter 251 steps through the matrix of bits 248, the various correlators are loaded, such that at then end of symbol time, a correlation can be calculated between the received bits and each possible set of code bits. Based on the strongest calculated correlation, a bit can be output (733) for each channel of data. For example, the decoder 230 can output a value for each channel 233A-D, during each symbol period, based on the indexing, demultiplexing, decoding and correlation process described above.

As depicted, the output data values can be provided (733) after the receiver has determined (732) that all chips for a given symbol have been processed. In other implementations, values may be output (733) before all chips have been processed. For example, in some implementations, it may be possible to make a correlation with some level of certainty before all chips have been processed. In other implementations, a predicted value for each channel may be output (733) throughout a given symbol time and updated as necessary as the correlation process progresses.

As shown, the reception process can continue until it is determined (735) that there are no more symbols to process. For example, the receiver 206 can continue providing data at the outputs 233A-D as long as data bits are received by the receive circuitry 224.

The method 700 is illustrated and described as providing coding (710) and multiplexing (707) on the transmit end, and demultiplexing (726) and decoding (729) on the receive end. As the reader will appreciate from the earlier description, the coding and decoding can include, in some implementations, spreading and dispreading, depending on the number of code bits used for each data bit and the manner in which the code bits are selected and the multiplexing is performed. In particular, use of a sufficiently dimensioned Hadamard matrix whose rows have been randomly shuffled can result in a data being coded, multiplexed and spread at a transmitter; and demultiplexed, decoded and despread at a receiver.

Figure 8:
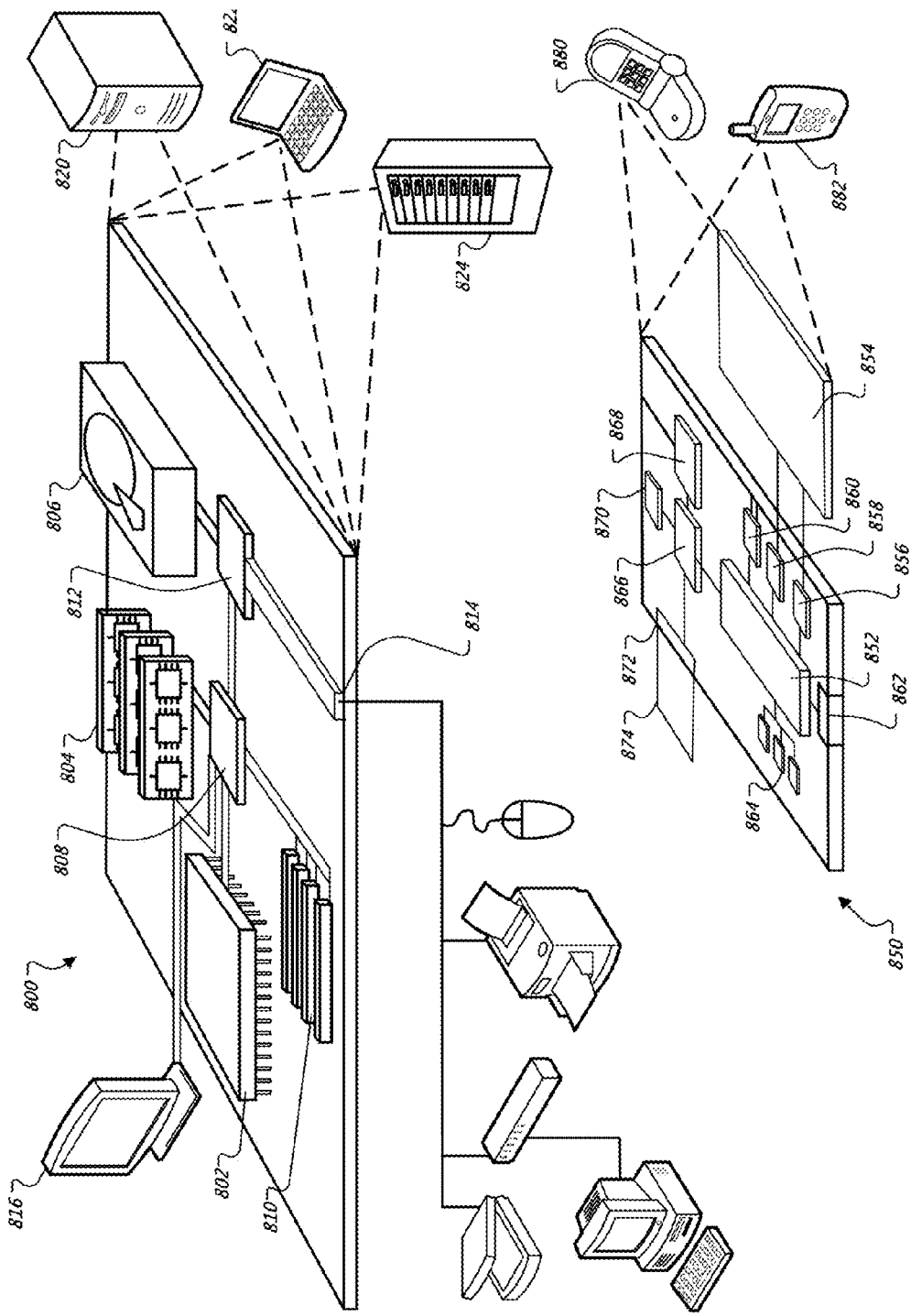
FIG. 8 shows an example of a computer device and mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 914 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 900. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 8950 communicating with each other.

Computing device 850 includes a processor 852, memory 864, an input/output device such as a display 854, a communication interface 866, and a transceiver 968, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 950, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 874, memory on processor 852, or a propagated signal that may be received, for example, over transceiver 868 or external interface 962.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Device 850 may also include one or more different devices that are capable of sensing motion. Examples include, but are not limited to, accelerometers and compasses. Accelerometers and compasses, or other devices that are capable of detecting motion or position are available from any number of vendors and can sense motion in a variety of ways. For example, accelerometers can detect changes in acceleration while compasses can detect changes in orientation respective to the magnetic North or South Pole. These changes in motion can be detected by the device 850 and used to update the display of the respective devices 850 according to processes and techniques described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, various forms of the flows shown above may be used, with steps re-ordered, added, or removed. Bits are described throughout the document in the context of binary values. In some implementations, data having more than two possible values can be processed. For example, the systems, methods and apparatus described may be modified to accommodate multistate values having three, four, or more possible states.

Accordingly, other implementations are within the scope of the following claims.

What is claimed is:

1. A computer-implemented method, comprising:
    receiving, at a transmitter, for a symbol time that comprises a plurality of chip times, a data value for each of a plurality of distinct data channel inputs; and
    for each of the plurality of the chip times in the symbol time: (a) indexing a different row of a matrix of data bits, the matrix of data bits having a plurality of rows and a plurality of columns; (b) selecting one channel from the plurality of distinct data channel inputs using a first subset of one or more columns of the indexed row; (c) determining a code value for the data value for the selected one channel from a plurality of possible code values that are derived from a second subset comprising of one or more columns of the indexed row, the second subset being different from the first subset; and (d) providing the determined code value to a transmission circuit for transmission to a receiver.

2. The method of claim 1, wherein the matrix of data bits comprises a first matrix that corresponds to a matrix having randomly or pseudo-randomly shuffled rows.

3. The method of claim 1, wherein the matrix of data bits comprises a first matrix that corresponds to a Hadamard matrix whose rows have been shuffled.

4. The method of claim 1, wherein data values received from the plurality of distinct data channel inputs and bits in the matrix of bits have binary values.

5. The method of claim 4, wherein the first subset comprises a number of columns corresponding to a base-2 logarithm of a number of data channel inputs in the plurality of distinct data channel inputs.

6. The method of claim 1, wherein (c) determining the code value comprises determining the code value based on the data value.

7. A method comprising:
    for each chip time in a symbol time that comprises a plurality of chip times: (a) receiving, at a receiver, a bit from a medium that couples the receiver to a transmitter; (b) indexing a different row of a matrix of data bits; (c) selecting one channel from a plurality of distinct data channel outputs, which correspond to a plurality of distinct channel inputs at the transmitter, using a first subset of one or more columns of the indexed row; and (d) comparing the received bit with each of multiple code values that are derived from a second subset of one or more columns of the indexed row, the second subset being different from the first subset; and
    outputting, at the receiver, a data value for each of the distinct data channel outputs, wherein the data values are based on the comparisons of the received bits and the derived code values.

8. The method of claim 7, further comprising synchronizing indexing in the receiver with indexing in the transmitter.

9. The method of claim 7, wherein the matrix of data bits comprises a first matrix that corresponds to a matrix having randomly or pseudo-randomly shuffled rows.

10. The method of claim 7, wherein the matrix of data bits comprises a first matrix that corresponds to a Hadamard matrix whose rows have been shuffled.

11. A system comprising:
    a transmitter comprising:
        a plurality of data channel inputs that receive corresponding data channel input values during each symbol time, wherein each symbol time comprises a plurality of chip times;
        a coder that codes each data channel input value with a corresponding data channel code value;
        a multiplexer that selects a data channel code value for one of the data channel inputs during each chip time; and
        transmit circuitry that transmits the selected data channel code value during each chip time to a receiver; and
    a receiver comprising:
        receive circuitry that receives data during each chip time;
        a demultiplexer that associates the received data with a particular data channel;
        a decoder that decodes data received during multiple chip times for each data channel; and
        a plurality data channel outputs that each provide decoded data for each data channel during a symbol time.

12. The system of claim 11, further comprising a controller that controls both the coder and the multiplexer based on a matrix of data bits.

13. The system of claim 12, wherein the controller controls the coder and multiplexer based on values in a different row of the matrix of data bits during each chip time.

14. The system of claim 12, wherein the matrix of data bits comprises a first matrix that is derived from a matrix having randomly or pseudo-randomly shuffled rows.

15. The system of claim 12, wherein the matrix of data bits comprises a first matrix that is derived from a Hadamard matrix whose rows have been shuffled.

16. The system of claim 12, wherein the transmitter comprises a transmitter counter that is incremented during each chip time, and wherein the receiver comprises a receiver counter that is incremented during each chip time that is synchronized with the transmitter counter.

17. The system of claim 12, wherein the transmitter further comprises a transmitter counter that indexes a row in the matrix of bits, and during each chip time, a first portion of indexed row controls the coder and a second portion of the indexed row controls the multiplexer.

18. The system of claim 12, wherein the receiver further comprises a receiver counter that indexes a row in the matrix of bits, and during each chip time, a first portion of the indexed row controls the demultiplexer and a second portion of the indexed row controls the decoder.

19. The system of claim 11, wherein the receiver further comprises a plurality of correlators that are employed, over the course of each symbol time, by the decoder to decode received data for each data channel.

20. The system of claim 19, wherein the plurality of correlators calculate a correlation between received data and each of a plurality of possible data channel code values.

21. The system of claim 12, wherein the controller controls the multiplexer based on a first subset of the columns of the matrix of data bits, and the controller controls the coder based on a second subset of the columns of the matrix of data bits, the second subset being different from the first subset.

22. The system of claim 12, wherein the controller controls both the decoder and the demultiplexer based on the matrix of data bits.

23. The system of claim 22, wherein the controller controls the demultiplexer based on a first subset of the columns of the matrix of data bits, and the controller controls the decoder based on a second subset of the columns of the matrix of data bits, the second subset being different from the first subset.

\* \* \* \* \*

UNITED STATES PATENT AND TRADEMARK OFFICE
CERTIFICATE OF CORRECTION

PATENT NO. : 8,654,817 B2  
APPLICATION NO. : 13/743633  
DATED : February 18, 2014  
INVENTOR(S) : Michial Allen Gunter Page 1 of 1

It is certified that error appears in the above-identified patent and that said Letters Patent is hereby corrected as shown below:

In the Claims

Column 20, line 40, Claim 11, after "plurality", insert -- of --.

Signed and Sealed this
Twenty-seventh Day of May, 2014

Michelle K. Lee
*Deputy Director of the United States Patent and Trademark Office*